United States Patent [19]

Kubik

[11] Patent Number: 4,669,266

[45] Date of Patent: Jun. 2, 1987

[54] CLOSED-LOOP SYSTEM FOR UNEQUAL DISPLACEMENT CYLINDER

[75] Inventor: Philip A. Kubik, Bloomfield Hills, Mich.

[73] Assignee: Kubik, Inc., Troy, Mich.

[21] Appl. No.: 706,901

[22] Filed: Feb. 28, 1985

Related U.S. Application Data

[63] Continuation of Ser. No. 539,105, Oct. 5, 1983, abandoned.

[51] Int. Cl.⁴ .......... F16D 31/02

[52] U.S. Cl. .......... 60/422; 60/476

[58] Field of Search .......... 60/475, 476, 405, 421, 60/422

[56] References Cited

U.S. PATENT DOCUMENTS

| | | | |
|---|---|---|---|
| 3,504,882 | 4/1970 | Vargo | 60/475 |
| 3,653,208 | 4/1972 | Kubik | 60/52 |
| 4,165,613 | 8/1979 | Bernhoft et al. | 60/420 |
| 4,188,787 | 2/1980 | Bromell et al. | 60/476 |
| 4,237,993 | 12/1980 | Jablonsky | 60/405 |

FOREIGN PATENT DOCUMENTS

| | | | |
|---|---|---|---|
| 2706091 | 8/1978 | Fed. Rep. of Germany | 60/475 |

*Primary Examiner*—William E. Wayner

*Attorney, Agent, or Firm*—Basile, Weintraub & Hanlon

[57] ABSTRACT

A fluid system has a variable displacement pump connected in a closed-loop circuit to a fluid cylinder having a piston and one connecting rod extending from the piston through an opposite side wall such that the effective pressure responsive areas on the opposite sides of the piston are unequal. The fluid system includes a circuit which permits an unequal displacement cylinder to be connected in a closed-loop circuit to a fluid pump.

1 Claim, 2 Drawing Figures

CLOSED-LOOP SYSTEM FOR UNEQUAL DISPLACEMENT CYLINDER

This application is a continuation of application Ser. No. 539,105, filed 10/5/83, now abandoned.

BACKGROUND OF THE INVENTION

I. Field of the Invention

The present invention relates to fluid systems for controlling the movement of an unequal displacement fluid cylinder and, in particular, the present invention relates to a closed-loop, hydrostatic system which is used to drive an unequal displacement cylinder.

II. Description of the Prior Art

Heretofore, numerous fluid systems have been employed for controlling the rate of movement of hydraulic motors and, in particular, a fluid system disclosed in my U.S. Pat. No. 3,653,208 issued on Apr. 4, 1972, discloses a closed-loop, hydrostatic system in which the output of a variable displacement pump is selectively directed at various rates to the opposite sides of a piston within an equal displacement fluid cylinder. There are a variety of applications when it is desirable to have a piston with only one piston rod. In such systems the effective pressure responsive areas on the opposite sides of the piston are unequal, and thus the volume of fluid to and from the opposite sides of the piston is also unequal. As a result, fluid cylinders having unequal displacements are not suited for closed-loop systems, as in closed-loop systems the fluid to and from the fluid pump must be substantially equal. A substantial advantage of a closed-loop system over an open-loop system is the availability of dynamic braking of the fluid cylinder in the closed-loop system.

It would therefore be desirable to provide a closed-loop fluid system which has all of the advantages as described in the fluid system disclosed in my issued Pat. No. 3,653,208 but which will drive an unequal displacement fluid cylinder and provide dynamic braking therefore.

SUMMARY OF THE INVENTION

The present invention, which will be described subsequently in greater detail, comprises a fluid system having a closed-loop fluid circuit for selectively connecting the inlet and outlet of an unequal displacement fluid cylinder to the inlet and outlet of the fluid pump in a closed-loop fashion.

It is therefore an object of the present invention to provide a fluid system for controlling the rate of movement of an unequal displacement fluid cylinder in a manner which is easily adjustable and controlled and which provides dynamic braking of the unequal displacement cylinder.

Other objects, advantages and applications of the present invention will become apparent to those skilled in the art of fluid systems and, in particular, closed-loop systems when the accompanying description of several examples of the best mode contemplated for practicing the invention is read in conjunction with the accompanying drawings.

BRIEF DESCRIPTION OF THE DRAWINGS

The description herein makes reference to the accompanying drawings in which like reference numerals refer to like components throughout the several views, and in which.

DESCRIPTION OF THE PREFERRED EMBODIMENTS

Figure 1:
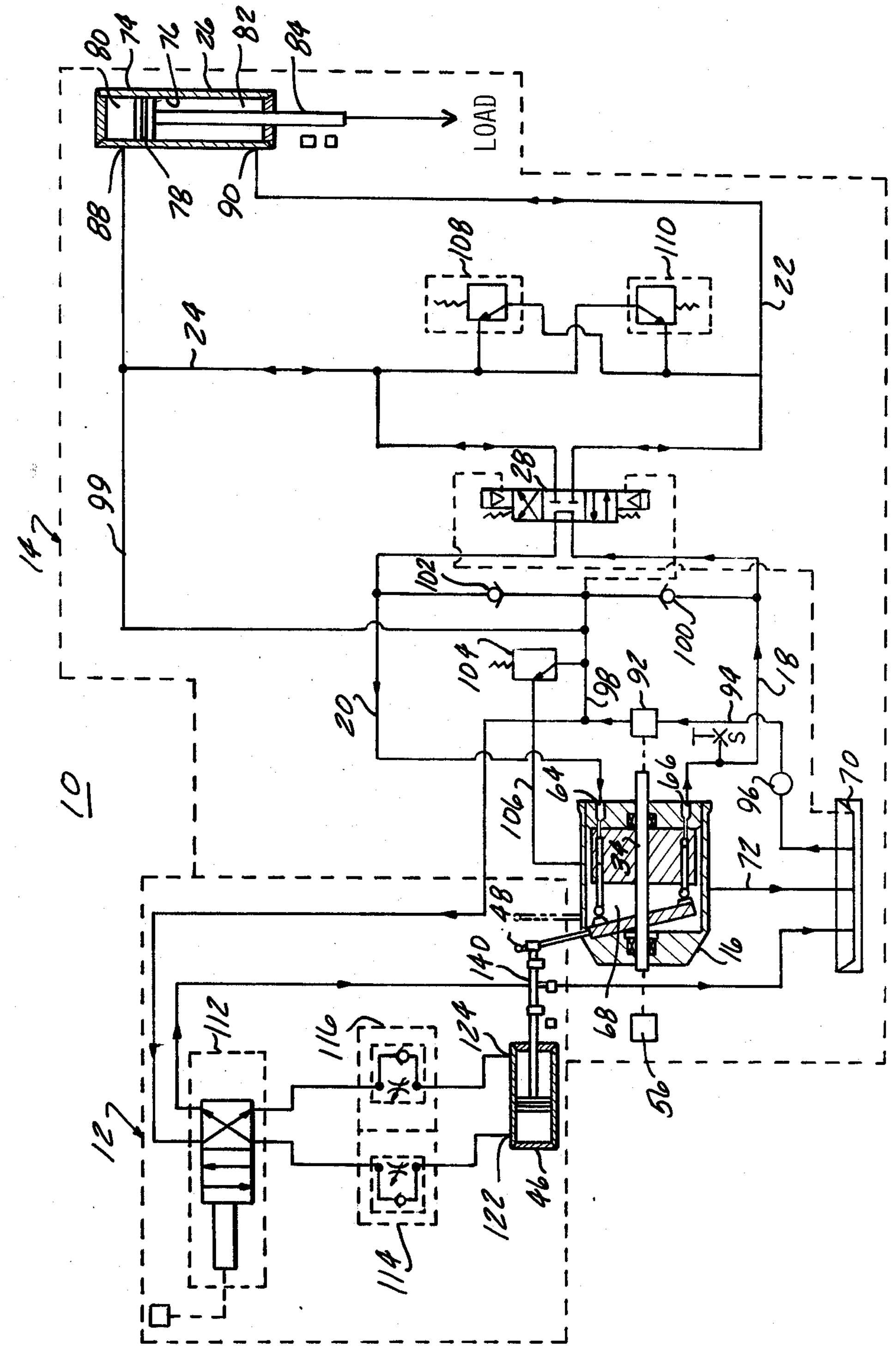
FIG. 1 is a schematic illustration of the present invention in the form of a fluid system in which a load located beneath the fluid cylinder is raised by the force of the pressure acting within the fluid cylinder and lowered under the force of gravity.

Referring now to the drawings and, in particular, to FIG. 1 wherein there is illustrated a fluid system 10 comprising a control circuit 12 and a main circuit 14. The main circuit 14 comprises a variable displacement pump 16 connected in a closed-loop manner by conduits 18, 20, 22 and 24 to a main fluid cylinder 26. Incorporated in the main circuit 14 is conventional directional control valve 28 which is a adapted to connect the conduits 18 and 20 selectively to the conduits 22 and 24 or be positioned tandem-center so as to allow communication between conduits 18 and 20 and prevent communication between conduits 22 and 24. The pump 16 may be of the well-known axial piston type, the details of which are set forth in greater detail in the aforementioned U.S. Pat. No. 3,653,208, the contents of which are incorporated herein by reference, and reference to such patent may be had for a better understanding of the pump 16. For purposes of this disclosure, it should be noted that a prime mover, such as an electric motor schematically illustrated at 56, is mechanically connected through a suitable coupling to the pump drive shaft 34 which in turn is suitably supported within the housing of the pump 16. The pump 16 has an inlet port 64 and an outlet port 66 which, respectively, communicate with the fluid conduits 20 and 18. The interior of the pump 6 and the components therein are immersed in a fluid housed in a pump case 68. As will be described in greater detail hereinafter, the pump communicates with a reservoir 70 through a charge pump 92 and either valving 100 or 102 and a conduit 94 on the inlet side of pump 92 and a conduit 72 connected on the drain side of the pump 16.

The main fluid cylinder 26 is conventional in its construction and has a cylindrical housing 74 with an internal bore 76 in which a cylindrical piston 78 is reciprocally mounted, dividing the internal bore 76 into two pressure chambers 80 and 82, respectively, on opposite sides of the piston. The side of the piston 78 associated with the pressure chamber 82 has a cylinder rod 84 which extends through the opposite end wall and externally of the main fluid cylinder 25 and is adapted to be coupled to the load that is to be raised and lowered by the action of the fluid cylinder 26. The pressure chambers 80 and 82 of the fluid cylinder 26 respectively have fluid ports 88 and 90 which, in turn, are respectively connected to the fluid conduits 24 and 22. Since the cylinder rod 84 reduces the area of the piston 78 exposed to pressure fluid within the pressure chamber 82, the effective pressure responsive areas on the opposite sides of the piston 78 are unequal. The cylinder 26 operates in a well-known manner to move the piston 78 in opposite directions within the cylinder bore 76 when one of the pressure chambers 80 or 82 is pressurized and the other pressure chamber is exhausted. In the present situation shown in FIG. 1 the pressure chamber 82 is pressurized and a force is exerted on the piston 78 to raise the piston 78 and thus the load carried thereby, via the cylinder rod 84, to a selected height. When it is desired to lower the load, fluid flowing into the chamber 80 via conduit 24 replenishes fluid necessary to make up for increasing volume as the piston 78 is lowered under the weight of the load that is carried thereby, all of which will be described in greater detail hereinafter.

The fluid system 10 is provided with a positive, fixed displacement replenishing pump 92, such as a gear pump, which is also driven by the prime mover 56 through the drive shaft 34. The replenishing pump 92 is in communication with the reservoir 70 through the aforementioned supply conduit 94 and a filter 96 for supplying the replenishing fluid to the main circuit 14 by means of a delivery conduit 98 which in turn communicates with the spring biased check valves 100 and 102. The spring biased check valves 100 and 102 communicates with the closed-loop main circuit conduits 18 and 20, respectively, for supplying replenishing fluid to whichever of the conduits 18 or 20 is the low pressure side of the closed main circuit through one of the check valves, while pressure on the high side of the main circuit maintains the other check valve closed.

The conduit 98, and thus fluid from the replenishing pump 92, also communicates with the cylinder port 88 via conduits 99 and 24.

A spring biased relief valve 104 is provided for the replenishing pump 92 for relieving excess fluid pressure in the replenishing delivery conduit 98 and for exhausting fluid to the reservoir 70 by means of a conduit 106 connected to the pump case 68 and then to the conduit 72. The relief valve 104 provides another primary function, as will be described hereinafter.

Downstream of the directional control valve 28, the conduits 22 and 24 are respectively connected to the inlets of high pressure relief valves 108 and 110 which, at a predetermined pressure, will exhaust the fluid pressure from one of the conduits to the other conduit so as to prevent damage to the main circuit in the event of overpressurization.

Referring now to the control circuit 12 for a description of the method of controlling the displacement of the fluid pump 16, there is illustrated a directional control valve 112 adapted to selectively connect fluid from the replenishing pump 92 to either of a pair of feed control valves 114 and 116 which in turn are respectively connected to the ports 122 and 124 of a secondary cylinder 46. The fluid cylinder, the construction of which is described in greater detail in the afroremen-tioned U.S. Pat. No. 3,653,208, has a connecting rod 140 that extends externally of the cylinder housing and is operatively coupled to the swash plate connecting arm 48 of the pump 16.

As decribed in greater detail in the aforementioned U.S. Pat. No. 3,653,208, the feed control valves 114 and 116 are of a conventional construction and thus do not require a detailed description. It can be seen from the drawings and from the description in U.S. Pat. No. 3,653,208 that the rate of change of the displacement of the fluid pump 16 is controlled by the feed control valves 114 and 116. Thus, if the restricted passages associated with the feed control valves are set to permit a high rate of flow passage therethrough, the cylinder rod 140 will be displaced rapidly, causing a rapid change in the displacement of the fluid pump 16 which, in turn, when communicated to the main fluid cylinder 26, will generate a rapid acceleration and/or deceleration of the cylinder piston 78 therein.

Referring to FIG. 1, during operation, when it is desired to direct fluid under pressure from the pump 16 to the cylinder pressure chamber 82 so as to raise the load, fluid under pressure in the conduit 18 is communicated via the directional control valve 28 and the conduit 22; the rate of acceleration being controlled by the settings in the control circuit 12. At the same time, fluid in the cylinder chamber 80 is exhausted through the port 88 with a portion thereof flowing into conduit 24 and returning to the pump 16 via the directional control valve 28 and conduit 20. Since the chamber 80 has a greater amount of fluid therein, the excess fluid will flow via conduit 99 to the replenishing circuit and be exhausted back through pump 68 via the spring biased relief valve 104. When it is desired to lower the load, the directional control valve 28 is shifted so as to communicate the pressure chamber 82 with the pump inlet 64 via conduits 22 and 20, while the chamber 80 is communicated via conduits 24 and 18 to the pump outlet 66. Thus, fluid from the pump 16 will flow into the chamber 80 which in conjunction with the weight of the load will permit the piston 78 to be lowered. Since the amount of fluid leaving the cylinder chamber 82 is less than the amount of fluid required by the chamber 80, excess fluid must be made up by the replenishing pump 92, which fluid flows through the conduit 99 and the cylinder port 88 into chamber 80.

It can also be seen that dynamic braking of the piston 78 may be accomplished in the conventional manner through the fluid flowing to the pump 16 via conduits 22 and 20, the situation which could not previously have been accomplished with unequal displacement cylinders because a closed-loop feature could not be had.

Figure 2:
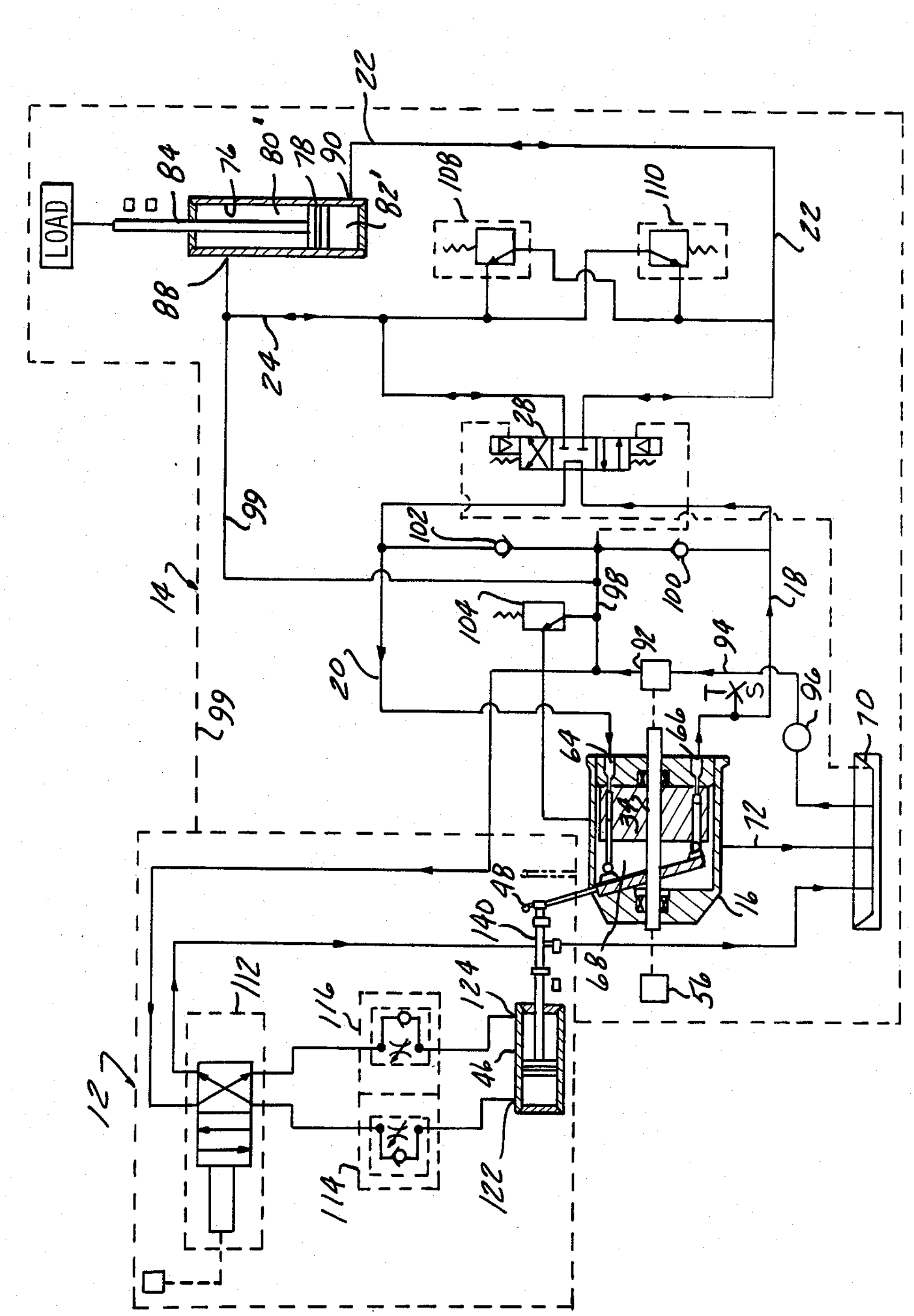
FIG. 2 is a schematic illustration of the present invention in the form of a fluid system in which the load is located above the fluid cylinder.

Referring now to FIG. 2, there is illustrated a second embodiment of the invention wherein like components as those illustrated in FIG. 1 are designated by the same numerals. In particular, the pressure chamber associated with the cylinder rod 84 is designated by the numeral 80', while the pressure chamber associated with the opposite side of the piston 78 is designated by the numeral 82'. All of the remaining components of the system illustrated in FIG. 2 are identified by the same numerals as those described hereinbefore with respect to the description of FIG. 1 and operate in an identical manner.

In the embodiment illustrated in FIG. 2, the load to be moved is mounted above the cylinder. Thus, in order to raise the load, the pressure fluid must be communicated to the chamber 82' while the pressure chamber 80' is exhausted. Similarly, to lower the load, fluid is exhausted from the pressure chamber 82' and the weight of the load itself under the force of gravity is what causes a lowering of the load.

In operation, the circuit illustrated in FIG. 2 is designed such that fluid under pressure may be communicated from the pump 16 via conduits 18 and 22 to the pressure chamber 82' so as to raise the load. The fluid in the pressure chamber 80' will be exhausted through the cylinder port 88 to the conduit 24. Since the amount of fluid required by the pump 16 is greater than that being exhausted from the port 88, fluid is made up from the replenishing pump 92 via conduits 98 and 99. When it is desired to lower the load, the pressure chamber 82' is communicated via conduits 22 and 20 to the inlet 64 of the pump 16 while fluid from the pump 16 is communicated via conduits 18 and 24 to the chamber 80'. Since the chamber 80' will require less fluid than that being exhausted from the chamber 82', the excess fluid is exhausted from the system via the conduit 99 and the relief valve 104.

It can thus be seen that the present invention has provided a unique system wherein an unequal displacement fluid cylinder may be connected to a closed-loop system providing dynamic braking for the cylinder.

While the form of the embodiment of the present invention, as disclosed herein, constitutes the preferred form, it is to be understood by those skilled in the art that other forms of the present invention may be had, all coming within the spirit of the invention and scope of the appended claims.

What is claimed is:

1. A closed-loop fluid system for driving a piston within a cylinder wherein the piston hydraulically divides the cylinder into a first and a second chamber and said piston has a piston rod extending through only one of said chambers whereby the effective piston area exposed respectively to said chambers is unequal, said piston rod being coupled to an external load urging said piston in one direction at all times, said system including a main pump having an inlet and an outlet, reversing valve means operable to selectively connect either of said chambers to the inlet of said main pump and to simultaneously connect the other of said chambers to the outlet of said main pump to shift said piston in a selected direction by transferring fluid between said chambers via said main pump;

said system further comprising a replenishing pump having a fluid outlet, conduit means connecting said fluid outlet of said replenishing pump directly to one of said chambers at all times, and pressure relief valve means connected to said conduit means for enabling said replenishing pump to augment the supply of fluid of said one of said chambers from said main pump when the pressure in said one of said chambers falls below a predetermined pressure and to relieve the pressure in said one of said chambers when the pressure in said one of said chambers rises above a predetermined pressure to thereby equalize the rates of flow of fluid into and out of said chambers.

* * * * *